G. C. NICHOLS.
Clamp for Cement-Pipes.
No. 162,683.        Patented April 27, 1875.
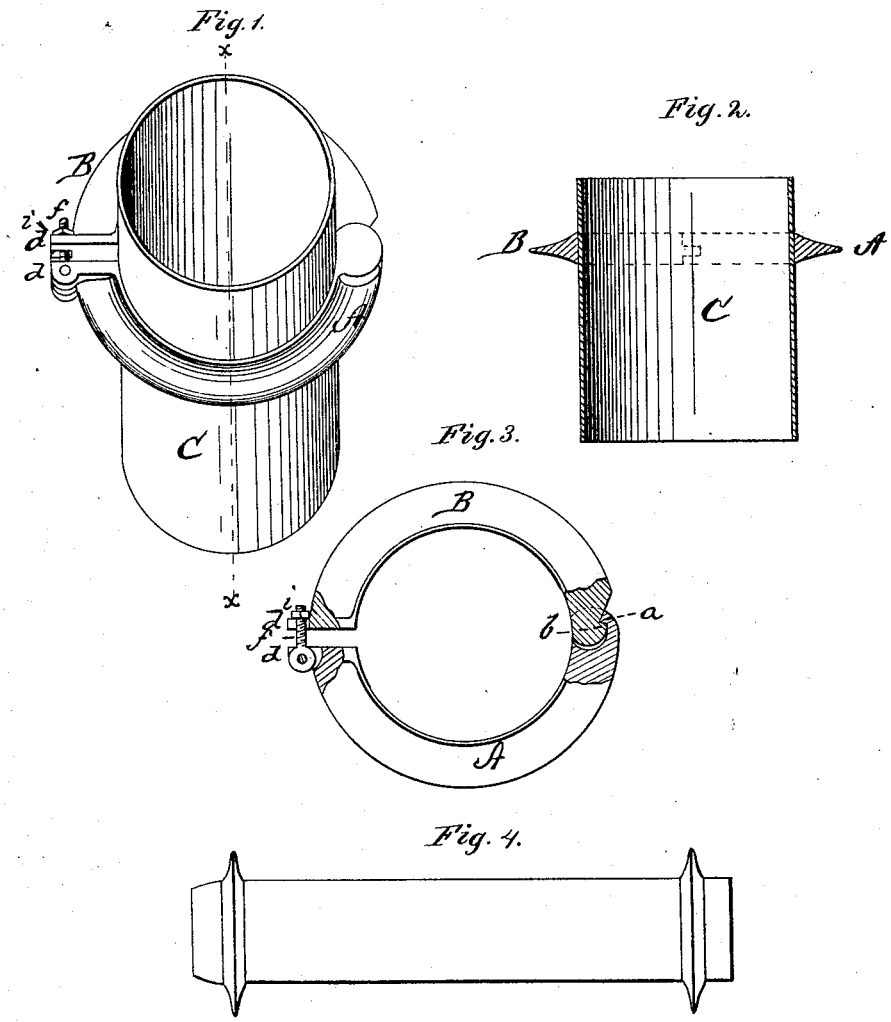

UNITED STATES PATENT OFFICE.

G. CLARKE NICHOLS, OF BINGHAMTON, NEW YORK.

IMPROVEMENT IN CLAMPS FOR CEMENT PIPES.

Specification forming part of Letters Patent No. 162,683, dated April 27, 1875; application filed December 5, 1873.

*To all whom it may concern:*

Be it known that I, G. CLARKE NICHOLS, of Binghamton, county of Broome and State of New York, have invented certain new and useful Improvements in Clamps for Cement Water and Gas Pipe, of which the following is a specification:

The nature of my invention consists in the construction and arrangement of a clamp or ring to be used in the improved method of connecting cement water and gas pipes, recently patented by me, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a perspective view, showing my clamp or ring applied to a sheet-metal pipe. Fig. 2 is a longitudinal section of the same through the line $x\ x$. Fig. 3 is a plan view of the ring, part in section; and Fig. 4 shows its use or application to a pipe.

My ring or clamp is made in two parts, A and B, each being a semicircle, and forming, when put together, a complete circle. One end of the part A is enlarged in thickness, and slotted, forming within said slot a hook, $a$. The corresponding end of the part B is made to fit in the slotted end of the part A, and forms a hook, $b$, to catch upon the hook $a$, whereby the two parts are hooked together. The opposite ends of the two parts A B are each provided with a slotted ear or projection, $d$, in one of which is pivoted an eyebolt, $f$, to drop into the slot in the other, when the ring is placed around the pipe. A nut, $i$, on the bolt $f$, is then tightened, and the pipe thereby made perfectly round.

The object of the ring or clamp thus constructed is to make the sheet-iron pipe C perfectly round, and keep it so until it is lined internally, and carted to the trench and laid, when the end is slipped over the thimble of the last pipe laid, when it is no longer necessary, and is taken off and sent back to the shop and put on another unlined pipe, and used as before. Also, by the use of this, in connection with the thimble described in my patent above referred to, the pipe is made perfectly rigid, which enables the workmen to handle the pipe as soon as the cement is set and cart it to the trench without incurring the danger of cracking the lining by the springing of the sheet-iron out of shape.

By the use of this invention the pipes may be laid the next day after lining, whereas, without it, they must stand about one week to enable the cement to harden before carting.

Having thus fully described my invention, what I claim as new, and desire to secure by Letters Patent, is—

In the manufacture of cement water and gas pipes, a ring or clamp made in two semicircular parts, A and B, and provided with hooks $a\ b$, slotted ears $d\ d$, pivoted eyebolt $f$, and nut $i$, substantially as and for the purposes herein set forth.

In testimony that I claim the foregoing as my invention, I hereunto affix my signature this 28th day of November, 1873.

G. CLARKE NICHOLS.

Witnesses:
WM. M. CROSBY, Sen.,
WM. M. CROSBY, Jr.